(12) United States Patent
Ochi et al.

(10) Patent No.: US 7,443,806 B2
(45) Date of Patent: Oct. 28, 2008

(54) COMMUNICATION MANAGEMENT APPARATUS AND METHOD FOR AN AUDIO DATA COMMUNICATION MANAGEMENT SYSTEM

(75) Inventors: Mitsunori Ochi, Hamamatsu (JP); Taku Nishikori, Hamamatsu (JP); Toshiyuki Ohshima, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1000 days.

(21) Appl. No.: 10/417,615

(22) Filed: Apr. 17, 2003

(65) Prior Publication Data
US 2003/0198229 A1 Oct. 23, 2003

(30) Foreign Application Priority Data
Apr. 19, 2002 (JP) ............................. 2002-118103
Apr. 19, 2002 (JP) ............................. 2002-118104
Apr. 19, 2002 (JP) ............................. 2002-118105

(51) Int. Cl.
H04L 12/28 (2006.01)
H04J 3/16 (2006.01)
G06F 15/16 (2006.01)
H04L 12/66 (2006.01)

(52) U.S. Cl. .................. 370/254; 370/463; 370/468; 709/209

(58) Field of Classification Search ............ None
See application file for complete search history.

(56) References Cited

U.S. PATENT DOCUMENTS 4,814,984 A 3/1989 Thompson
5,461,608 A * 10/1995 Yoshiyama ................. 370/222
5,574,979 A * 11/1996 West ......................... 455/63.1
6,112,230 A * 8/2000 Monch et al. ............... 709/208
6,199,133 B1 * 3/2001 Schnell ....................... 710/110
6,298,376 B1 10/2001 Rosner
6,467,583 B1 10/2002 Koura et al.
6,523,696 B1 2/2003 Saito et al.
6,876,850 B2 * 4/2005 Maeshima et al. ......... 455/422.1
6,996,112 B2 2/2006 Fukunaga et al.

(Continued)

FOREIGN PATENT DOCUMENTS

EP 0625838 11/1994

(Continued)

OTHER PUBLICATIONS

A Partial-Destination-Release Strategy for the Multi-Token Ring Protocol, May-Yew Wee and Ahmed E. Kamal, Department of Computing Science, University of Alberta, Edmonton, Alberta T6G 2H2, Canada.

(Continued)

*Primary Examiner*—Gregory B Sefcheck
(74) *Attorney, Agent, or Firm*—Morrison & Foerster LLP

(57) ABSTRACT

A communication management system is consisted of a plurality of apparatuses connected to a network. Each apparatus comprises: a transmitter that transmits first setting information representing all setting status of own apparatus to the other apparatuses connected to the network; a receiver that receives second setting information representing all setting status of the other apparatuses connected to the network from the other apparatuses; and a storing device that stores the first and the second setting information. Desired data relating to all the devices connected to the network can be confirmed quickly.

19 Claims, 10 Drawing Sheets

U.S. PATENT DOCUMENTS

| | | | |
|---|---|---|---|
| 7,158,561 B2 * | 1/2007 | Fujii et al. | 375/219 |
| 2002/0026492 A1 * | 2/2002 | Fujita | 709/208 |
| 2002/0055978 A1 | 5/2002 | Joon-Bo et al. | |

FOREIGN PATENT DOCUMENTS

| | | |
|---|---|---|
| EP | 0837579 | 4/1998 |
| EP | 0837579 A2 | 4/1998 |
| EP | 1134937 | 9/2001 |
| EP | 1134937 A1 | 9/2001 |
| EP | 0 625 838 A2 | 1/2004 |
| GB | 2272611 | 5/1994 |
| JP | 08-046623 | 2/1996 |
| JP | 10-126423 | 5/1998 |
| JP | 10-313329 | 11/1998 |
| JP | 11-234291 | 8/1999 |
| JP | 2000-324125 | 11/2000 |
| JP | 2001-144783 | 5/2001 |
| JP | 2002-111689 | 4/2002 |
| WO | WO-01/79102 | 10/2001 |

OTHER PUBLICATIONS

A Partial-Destination-Release Strategy for the Multi-Token Ring Protocol, May-Yew Wee and Ahmed E. Kamal, Department of Computing Science, University of Alberta, Edmonton, Alberta T6G 2H1, Canada.

Yoshihiro Tanabe et al., "Multi-Access Control System", NHK Technical Report, May 15, 1977, vol. 20, No. 5, pp. 20-27.

* cited by examiner

COMMUNICATION MANAGEMENT APPARATUS AND METHOD FOR AN AUDIO DATA COMMUNICATION MANAGEMENT SYSTEM

CROSS REFERENCE TO RELATED APPLICATION

This application is based on Japanese Patent Application 2002-118103, 2002-118104 and 2002-118105, filed on Apr. 19, 2002, the entire contents of which are incorporated herein by reference.

BACKGROUND OF THE INVENTION

A) Field of the Invention

This invention relates to a communication management system and a communication management apparatus that constitutes a communication management system. More in detail, the present invention relates to a communication management system that transmits data to a network efficiently by managing states of a plurality of devices connected to a network and setting a master device to manage communication of all the devices connected to the above network.

B) Description of the Related Art

There is a standard such as the IEEE 1394 Standard and the like that transmits and receives audio digital data and the like via a network. According to the IEEE 1394 Standard, audio data and the like can be transmitted at a high speed, and also setting for a device connected to the network can be executed at a high speed. However, a standard of high-speed communication such as the IEEE 1394 Standard is for a short distance communication. For example, in a case that a high-speed communication is executed by the IEEE 1394 Standard, an actual transmission distance is 10 meters or less, and a long distance communication cannot be executed.

As a standard for transmitting and receiving audio digital data and the like via a long distance communication network, for example, there is a standard for transmitting and receiving a multi-channel uncompressed audio signal (audio digital data) such as the CobraNet (a trade mark) and setting information by Ethernet (a trade mark). In this standard, communication can be executed in a distance from 100 meters to a few kilometers.

In a system that executes transmissions and receptions of audio digital data and the like via the long distance communication network, one of the devices in the system connected to the same network is set to be a master device (hereinafter simply called "master") to manage a communication order, and other devices are set to be slave devices (hereinafter simply called "slave"). In this case, priorities of the all devices connected to the network are compared, and a device having the highest priority will be always the master device.

A device to be the master device transmits a transmission order of all the devices including its own device to the network, and other devices (slaves) transmits one by one in accordance with the order. When transmission of one device is finished, an instruction for starting the next transmission is transmitted to the next device, and a device having a next order (priority) receives the instruction and starts the next transmission. By repeating these processes, transmission of each device is made one by one at once.

In the device that executes transmission and receiving audio digital data and the like via the above long distance communication network, data is transmitted normally with a communication rate of about 90 Mbps. However, most parts (70 to 80 percent) of communication rate are used for communication of main data such as audio data, and setting information has lower priority than the main data. Therefore, the setting information and the like can use only a little part (one percent or less) of the communication rate, and communication speed is very slow.

In a case of confirming a state of other device (an external device) connected to a network is requested, it is necessary to obtain data representing the state of other device each time. At the time of confirming the state, a request for obtaining state confirming data is transmitted to the network, and it is necessary to wait for that other device transmits the state confirming data based on the request. Since the transmission speed of setting information is very slow, it requires a huge time. Therefore, it is very difficult to confirm quickly the state of other device connected to the network with the device described in the above.

Moreover, since transmission and reception of main data (audio data) are the highest priority with the device described in the above, other data cannot be transmitted and received during the transmission and reception of audio data. Therefore, the state of other device cannot be confirmed until the transmission and reception of audio data finishes.

Also, when other device (an external device) is newly connected to the network, priorities of all the devices connected to the network are compared each time, and a device having the highest priority will be a master. Therefore, a process to obtain the master is needed each time when a new device is connected.

Moreover, it is not preferable that a master is changed whenever a new device is connected, since process for obtaining a master is executed at a low communication rate, and it takes a great time.

Moreover, in the communication network described in the above, when data transmission of one device is finished, an instruction for starting transmission is transmitted to a next device, and the next device receives the instruction to start data transmission. During transmission of a certain device finishes and the next transmission is started any data do not flow on the network. Therefore, times when no data flows on the network likely to exist, and it will be difficult to transmit data efficiently.

SUMMARY OF THE INVENTION

It is an object of the present invention to provide a communication management apparatus that can quickly confirm desired data relating to all the devices connected to the network.

It is another object of the present invention to provide a communication management apparatus that can quickly confirm desired data from any devices connected to the network.

It is further object of the present invention to provide a communication management apparatus that can always confirm data of a device connected to the network.

Further, It is other object of the present invention to provide a communication management apparatus that can prevent that a master to manage communication between all the devices connected to the network is frequently changed.

Further, It is other object of the present invention to provide a communication management apparatus that can shorten a time when no data flows on the network and therefore can execute data transmission efficiently.

According to one aspect of the present invention, there is provided a communication management apparatus, forming a communication management system wherein a plurality of the communication management apparatuses are connected to a network, the communication management apparatus comprising: a transmitter that transmits first setting information representing all setting status of own apparatus to the other apparatus connected to the network; a receiver that receives second setting information representing all setting status of the other apparatus connected to the network from the other apparatus; and a storing device that stores the first and the second setting information.

According to another aspect of the present invention, there is provided a communication management apparatus, comprising: a connector that connects to a network; a timer that times a first predetermined time after the connecting device is ready to connect to the network; and a master confirming device that confirms an existence of a master apparatus managing communication of the network on the network during the first predetermined time.

According to further aspect of the present invention, there is provided a communication management apparatus, comprising: a determining device that determines a transmission time to transmit an instruction for starting a transmission to other apparatus connected to a network in accordance with a move-up time determined based on a transmission time of data to be transmitted and a delay time of the transmission of the data to the network; and a transmitter that transmits the data to be transmitted and the instruction for starting a transmission to the other apparatus at the transmission time.

According to the present invention, desired data relating to all the devices connected to the network can be confirmed quickly.

Also, according to the present invention, desired data can be confirmed from any devices connected to the network.

Further, according to the present invention, data of a device connected to the network can always be confirmed Moreover, according to the present invention, it can be prevented that a master to manage communication between all the devices connected to the network is frequently changed.

Also, according to the present invention, time when no data is flowing on the network can be shortened, and data transmission can be executed efficiently.

DETAILED DESCRIPTION OF THE PREFERRED EMBODIMENTS

Figure 1:
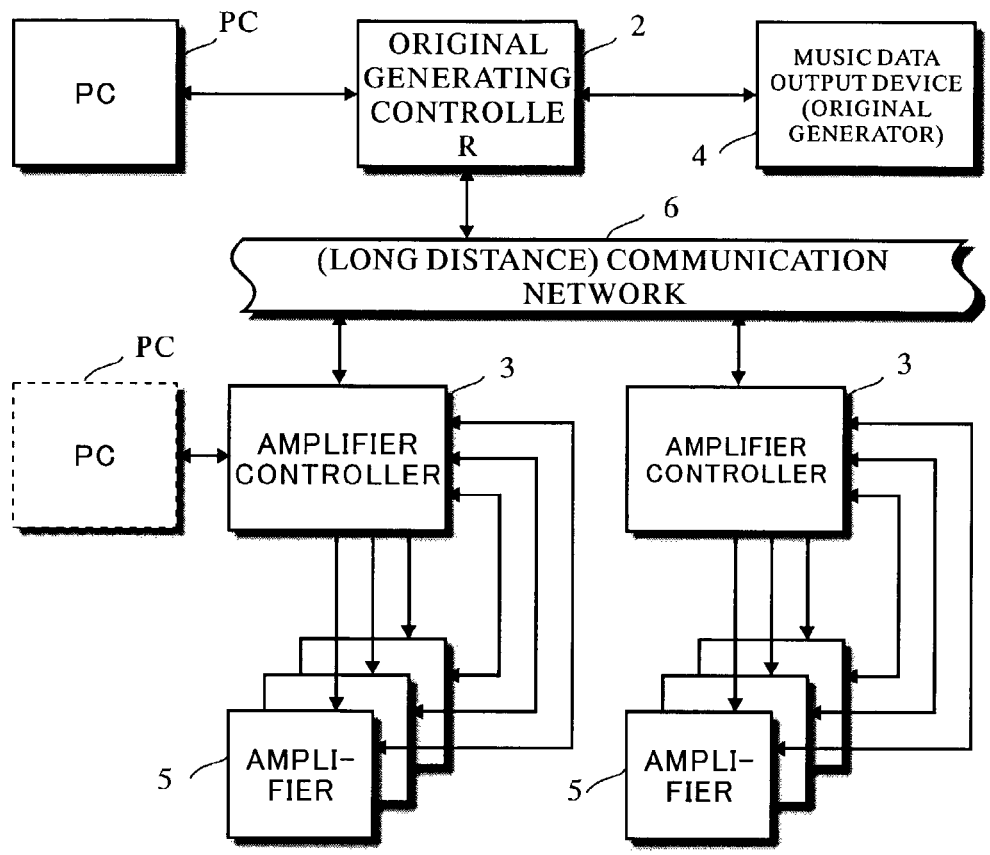
FIG. 1 is a block diagram showing a network structure of a communication management system 1 according to an embodiment of the present invention.

FIG. 1 is a block diagram showing a network structure of a communication management system 1 according to an embodiment of the present invention. The communication management system 1 is consisted of connection via a long distance communication network 6 between an original generating controller 2 and one or a plurality of amplifier controllers 3 each of which has a function as a communication management apparatuses.

The long distance communication network 6 is a communication network that can transmits and receives, for example, a multi-channel uncompressed audio signal (audio digital data) such as the CobraNet and setting information and the like of a device connected to the network 6 with Ethernet (a trade mark). Also, in the long distance communication network 6, huge data-sized main data such as audio digital data, moving picture digital data and the like is transmitted at a high transmission rate, and other, for example, setting information and the like, is transmitted at a low communication rate. In the long distance communication network 6, for example, data is transmitted normally with a communication rate of about 90 Mbps. However, most parts (70 to 80 percent) of communication rate are used for communication of main data such as audio data, and setting information has lower priority than the main data. Therefore, the setting information and the like can use only a little part (one percent or less) of the communication rate, and communication speed is very slow.

A music data output apparatus (an original generator) 4 is consisted of an electronic musical instrument that can output digital audio data or MIDI data, a musical tone generating apparatus, an audio apparatus and the like.

A computer PC is consisted of a personal computer and the like. The computer PC receives status data 18 including setting data AS that represents a setting status of an amplifier 5 described later and the like and represents setting status of all apparatuses on the communication management system 1. A user refers to the represented setting status and can change it. The changed setting status is transmitted to the original generating controller 2 as modification data. The setting data and the modification data are explained in detail later.

Also, the computer PC can be connected to all the communication management apparatuses (the original generating controller 2 and the amplifier controllers 3) on the network, and the above process can be executed at a time of connecting any communication management apparatuses. For example, as shown with a dotted line in FIG. 1, even when the computer PC is connected to the amplifier controller 3, a same process can be executed as a case of connecting to the original generating controller 2.

The original generating controller 2 is connected to the music data output apparatus (the original generator) 4 and the computer PC and the like. The original generating controller 2 receives audio digital data input from the music data output apparatus (the original generator) and MIDI data. Also, the original generating controller 2 transmits the status data 18 to the computer PC and receives the modification data from the computer PC.

The original generating controller 2 packetizes input audio digital data, MIDI data, received modification data, the status data 18, the later-described acquisition data 20, turn data 21, participation data 22, start data 24 and the like to transmit to the network 6.

Also, the original generating controller 2 receives packet of the modification data, the status data 18, acquisition data 20, turn data 21, participation data 22, start data 24 and the like from the network 6 and releases the packetification of them. Moreover, in a case of receiving audio digital data and MIDI data, the original generating controller 2 releases packetification and can output them to outside.

Each of the amplifier controllers 3 receives the packet of audio digital data, MIDI data, modification data, status data 18, acquisition data 20, turn data 21, participation data 22, start data 24 and the like from the network 6 and releases the packetification of them. The modification data in the received data that is released the packetification is transmitted to an amplifier 5.

Also, the received audio digital data and MIDI data is output to the amplifier 5 after converting to audio analogue data (analogue sound signal). Moreover, the received audio digital data and MIDI data may be converted to digital data with a form that can reproduce with normal amplifier and output to the amplifier as digital audio signal.

Also, a plurality of the amplifiers 5 can be connected to one amplifier controller 3. Setting data AS is obtained (received) from a newly connected amplifier 5, and modification data is obtained (received) in a case that there is modification with setting of already connected amplifier 5.

Moreover, the amplifier controller 3 packetizes modification data, status data 18, later-described acquisition data 20, turn data 21, participation data 22, start data 24 and the like to transmits to the network 6. Also, when audio digital data and MIDI data is input from outside, the amplifier controller 3 packetizes them to transmit to the network 6.

Each of the amplifiers 5 is an amplifier for reproducing audio analogue data input from the amplifier controller 3. When an instruction for modifying the setting is given by using its own switch, the amplifier 5 changes the stored setting information and forms modification data representing the contents of the modification for transmitting to the amplifier controller 3. Also, when an amplifier 5 is newly connected to the amplifier controller 3, it transmits setting data AS that represents all setting status of its own apparatus to the amplifier controller 3.

Figure 2:
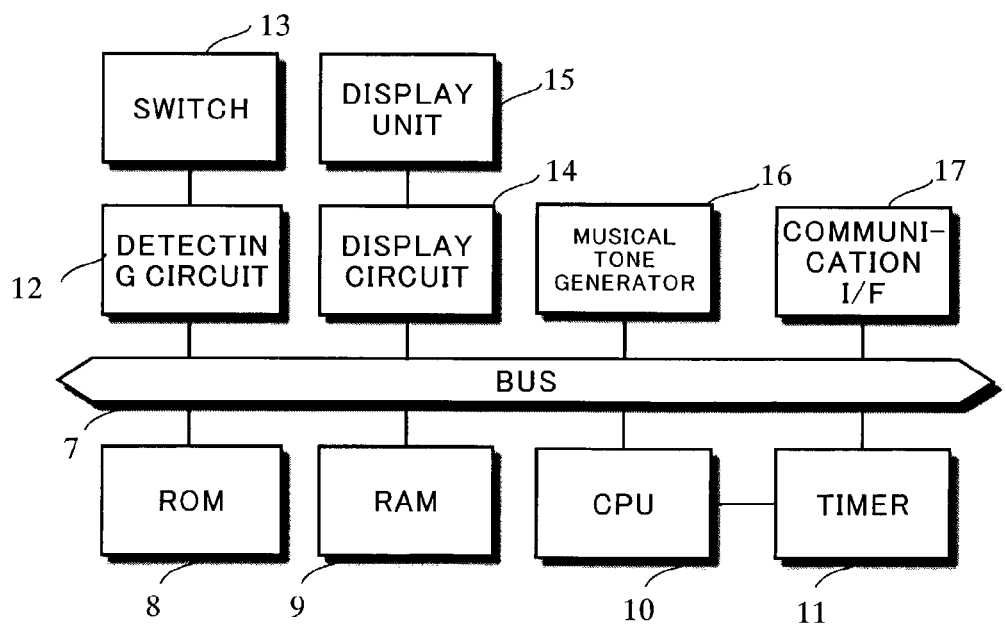
FIG. 2 is a block diagram showing a hardware structure of a communication management apparatus (an original generating controller 2 and an amplifier controller 3) according to the embodiment of the present invention.

FIG. 2 is a block diagram showing hardware structure of a communication management apparatus (an original generating controller 2 and an amplifier controller 3) according to the embodiment of the present invention.

A ROM 8, a RAM 9, a CPU 10, a timer 11, a detecting circuit 12, a display circuit 14, a musical tone generator 16 and a communication interface 17 are connected to a bus 7 of the original generating controller 2 or an amplifier controller 3.

In the ROM 8, various kinds of parameters and a controlling program or a program for realizing the embodiment of the present invention can be stored. Also, an apparatus ID described later is stored in the ROM 8. The RAM 9 has a working area of the CPU 10 that stores a flag, a register or a buffer, various kinds of parameters and the like. Also, audio digital data received from the network 6 and MIDI data is temporarily stored in the RAM 9, and the RAM 9 has a temporal storage area (buffer) to store various kinds of data such as status data 18 and the like.

Moreover, in addition to the ROM 8 and the RAM 9, an external storage device that can rewrite with a memory backup function such as a flash memory, a semiconductor memory, a hard disk and the like may be connected to the bus 7 in the communication management apparatus, and various kinds of data such as status data 18 and the like may be backup after turning the power off.

The CPU 10 executes calculation or controls according to a control program and the like stored in the ROM 8. The timer 11 is connected to the bus 7 and provides a basic clock signal, a reproducing process timing, an interrupting timing and the like to the CPU 10.

A switch 13 is, for example, a plurality of switches, a keyboard for inputting words, a mouse and the like, and connected to the detecting circuit 12. The switch 13 may be anything that can output signal corresponding to an input by a user.

The display circuit 14 is connected to a display unit 15, and can display various kinds of information such as setting information of each device connected to the network. The user inputs various kinds of information and executes settings with reference to the information displayed on this display unit 15.

The musical tone generator 16 includes a D/A converting unit. The musical tone generator 16 converts audio digital data received from the network 6 and MIDI data into audio analogue data to output to the amplifier 5 and the like via the communication interface 17 again. Also, in a case that audio analogue data is received from the music data output device 4 via the communication interface 17, the musical tone generator 16 converts it to audio digital data, and can transmit it to the network 6 via the communication interface 17.

The communication interface 17 is consisted of a communication interface for connecting to the network and plurality of interfaces including communication interfaces for connecting to the computer PC.

The communication interface for connecting to the network can connect to a local area network (LAN), the Internet and the long distance communication network 6 such as a telephone line, and can transmit audio digital data, MIDI data, status data 18, acquisition data 20, turn data 20, participation data 22, start data and the like, and can receive these packets to release packetization.

The communication interface for connecting to the computer PC can connect to the computer PC. The interface transmits status data 18 to the computer PC to receive modification data from the computer PC.

In a case of using the communication management apparatus as an original generating controller 2, an interface for connecting to the original generator will be equipped in addition to the above two interfaces. The interface for connecting to the original generator is an input terminal that can input MIDI data and audio digital data from the original generator 4.

Also, in a case of using the communication management apparatus as an amplifier controller 3, an interface for connecting to the amplifier will be equipped in addition to the above two interfaces. The interface for connecting to the amplifier transmits an output terminal that can output audio analogue data (an analogue sound signal) to the amplifier 5 and includes a communication interface that can receive setting data AS and modification data.

Moreover, all of the above-described interfaces may be equipped regardless of a usage style (usage as the original generating controller 2 or the amplifier controller 3) of the communication management apparatus. By doing that, a usage style of the communication management apparatus can be modified depending on a situation.

Moreover, in this specification, the above-described various kinds of communication interfaces are called a communication interface 17.

Figure 3:
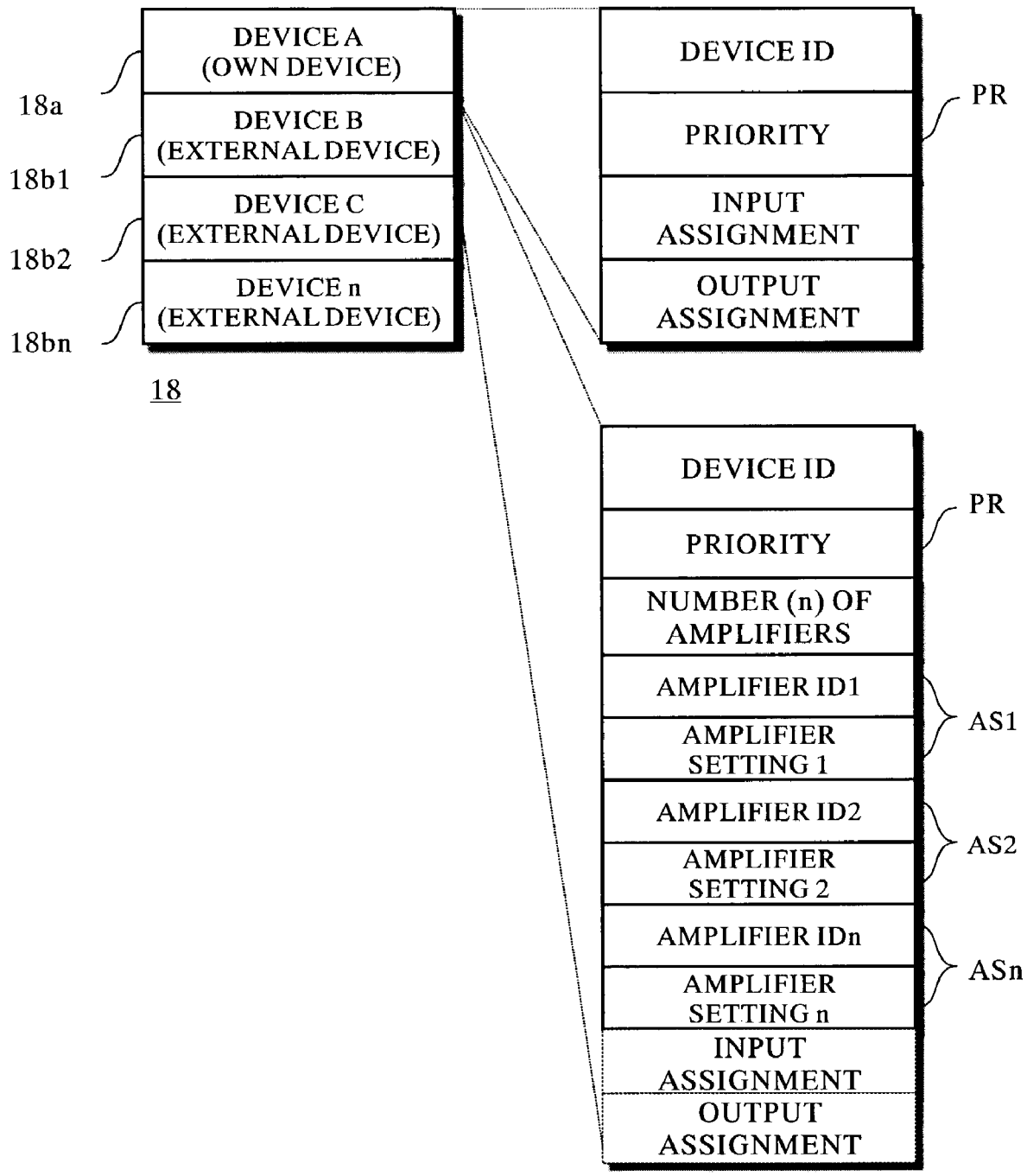
FIG. 3 is a schematic diagram showing a structure of status data 18 according to the embodiment of the present invention.

FIG. 3 is a schematic diagram showing structure of status data 18 according to the embodiment of the present invention. In FIG. 3, the status data 18 is shown in a case of being stored in the original generating controller 2 in FIG. 1. In the amplifier controller 3, a device B in FIG. 3 is stored as its own data.

The status data 18 is formed of status data 18*a* that represents its own setting status and status data 18*b*1 to 18*bn* which represent setting status of external devices. In a case that the status data 18 is transmitted to outside, only the status data 18*a* that represent its own setting status may be transmitted, or the status data 18*b*1 to 18*bn* that represent setting status of the external devices may be transmitted with the status data 18*a*.

The status data 18*a* that represents its own setting status (in this example, data that represents setting status of the original generating controller 2) is formed of a unique device ID for each device, priority PR referred at a time of requesting master acquisition described later, input and output assignments (information that represents to which amplifier to be output each data of a plurality of channels to be input from the original generator) of the original generator 4 that is connected to the original generating controller 2. Moreover, priority PR is set by manual in order not to overlap with other devices (i.e., external devices).

Each of the status data 18*b*1 to 18*bn* (in this example, data that represents setting status of one of the amplifier controllers 3) which represents setting status of external device is formed of a unique device ID for each device, priority PR, the number (n) of the amplifier 5 connected to the amplifier controller 3 and setting data AS1 to ASn which represent setting of each amplifier 5. Also, each of the status data 18*b*1 to 18*bn* may include the input and output assignments of the original generator 4 that is connected to the original generating controller 2.

Each of the setting data AS1 to ASn that represents setting of the amplifiers 5 is consisted of a unique amplifier ID (either one of amplifier ID1 to IDn) and amplifier setting (either one of amplifier setting 1 to n). Each of the amplifier settings 1 to n represents a present setting status of each amplifier, and for example, it is a parameter that a user can set in a normal amplifier such as speaker output, mute setting, volume and the like.

When a part of parameters included in these amplifier settings 1 to n is modified, modification data is formed by putting the modified parameter together with the amplifier ID that modifies setting.

Figure 4:
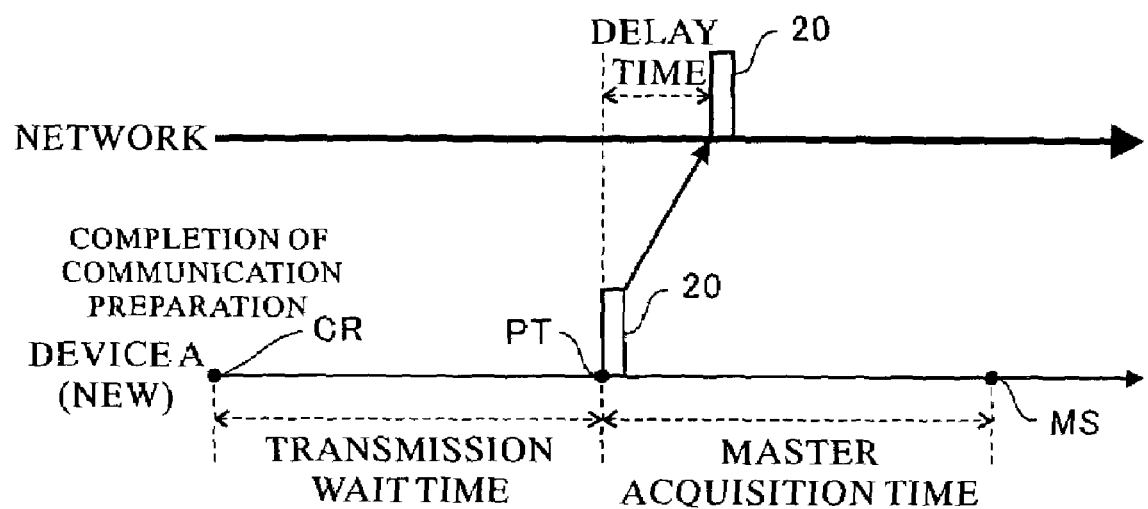
FIG. 4 is a schematic diagram showing a first example of a master device designation process according to the embodiment of the present invention.

FIG. 4 is a schematic diagram showing a first example of a master device designation process according to the embodiment of the present invention. In this example, a case is explained that a device connected to the network at first will be a mater. Moreover, a time represented in the drawing flows from left to right. Also, "the network" represents a status of data flowing on the network.

When the device A (a combination of an original generating controller 2 and an amplifier controller 3) is connected to the communication network 6, initial setting for communication preparation is executed. In the drawing, a time when the preparation for communication of the device A is completed and transmission and reception becomes possible is indicated with a timing CR.

The device A starts timing of duration of transmission wait time to stop transmission process after completion of the communication preparation. The transmission wait time is duration for a plurality of cycles, in each cycle, all the devices on the network transmit at least one data. In the embodiment of the present invention, the transmission wait time is predetermined to be two seconds in advance. That is, in the embodiment of the present invention, the transmission wait time is from the communication preparation completion timing CR to packet transmission start timing PT that is two seconds after the timing CR.

This transmission wait time is time for confirming that acquisition data 20 or turn data 21 which are described later are not transmitted from other device. If these data 20 and 21 are not transmitted, it can be judged that there is no master device in the network.

The device A transmits acquisition data 20 to the network 6 in the packet transmission start timing PT after passing the transmission wait time. The acquisition data 20 is data for requesting that own device becomes to be a master, and at least the device ID and priority PR are included.

The acquisition data 20 transmitted from the device A is presented on the network after passing the transmission wait time. Delay time is time for data communication between devices and includes a sum of a storing time of transmission data of a transmission device; a packetizing time of the transmission device; transmission time; and a packet releasing time of a receiving device. In the embodiment of the present invention, the delay time is predetermined to be 20 ms.

After transmitting the acquisition data 20, the device A starts timing of duration of a master acquisition time. The master acquisition time is wait time for receiving acquisition data 20 from other device on the network. If acquisition data 20 is not received from the other device during the master acquisition time, a process for setting to be a master is executed at a timing after passing the master acquisition time.

Moreover, the master acquisition time is duration for a plurality of cycles, in each cycle, all the devices on the network transmit at least one data as same as the transmission wait time. Therefore, the master acquisition time is predetermined to be two seconds as same as the transmission wait time. Further, in this network, data is transmitted by only one device at a time.

In the above-described case that there is no other device on the network, the device that is connected to the network 6 at first will be a master.

Figure 5:
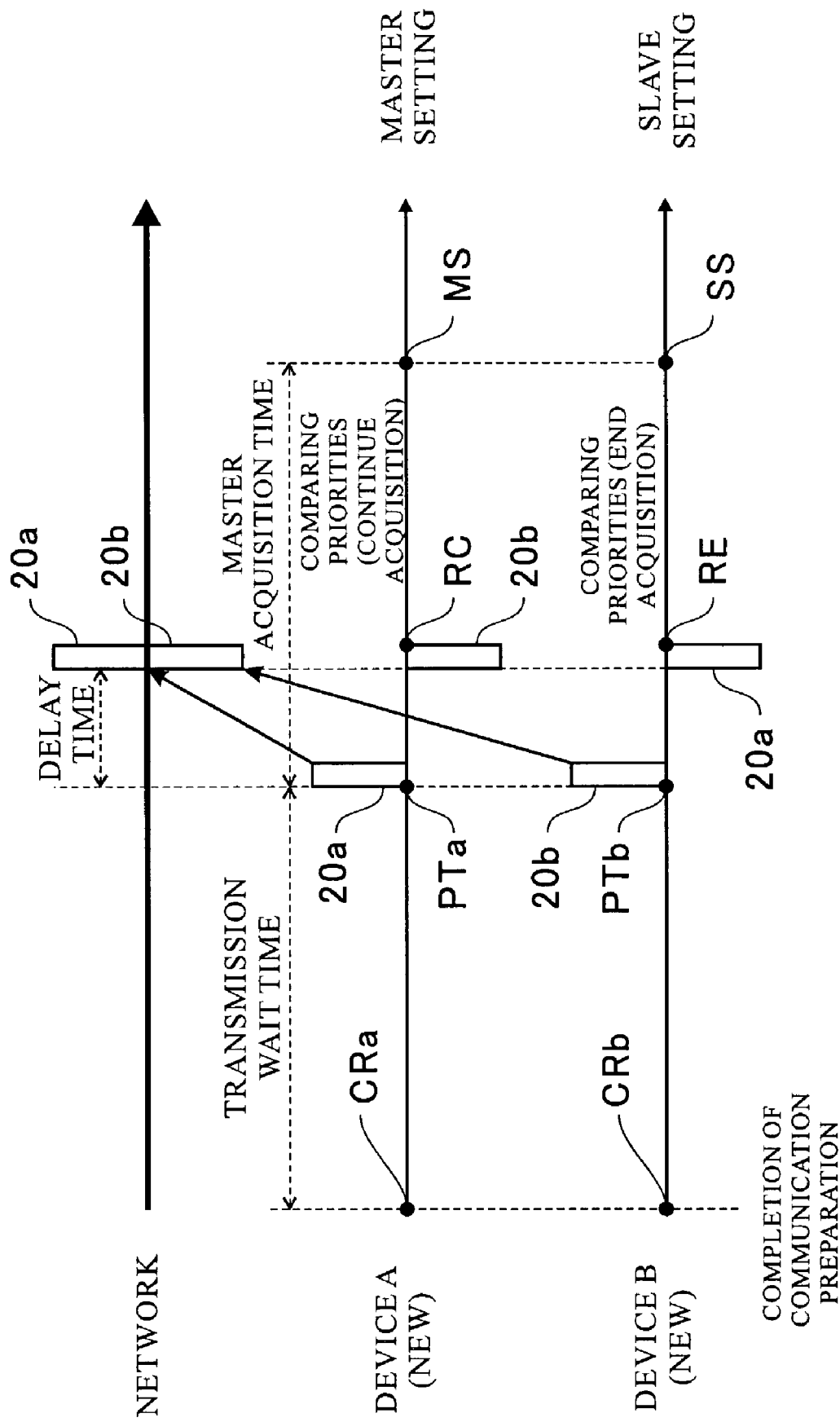
FIG. 5 is schematic diagram showing a second example of a master device designation process according to the embodiment of the present invention.

FIG. 5 is schematic diagram showing a second example of the master device designation process according to the embodiment of the present invention. In this example, a master setting operation in a case that the device A and a device B are connected to the network where there is no master at the same time is shown. Moreover, time flow represented from left to right in the drawing. Also, the network represents a status of data flowing on the network. Also, transmission data is indicated on a horizontal line of the devices A and B, and reception data is indicated below the horizontal line of the devices A and B.

Also, the case that the devices A and B are connected to the network 6 at the same time is explained in this example, and a same operation is executed in a case that the device B (the device A) is connected during the transmission wait time after the device A (the device B) is connected. Hereinafter, in this specification, this case and the case of connection during the transmission wait time of a device connected to the network 6 first are called "connecting at the same time".

Although which device of the devices A and B becomes a master is normally determined by comparing priorities PR (based on priorities PR of the status data 18 in FIG. 3)

included in the acquisition data 20, the priority PR of the device A is higher than that of the device B in this example.

When the devices A and B (a combination of the original generating controller 2 and the amplifier controller 3) are connected to the network 6, initial setting for communication preparation is executed. Times when the preparation for communication of the devices A and B are completed and transmission and reception becomes possible is indicated with timings CRa and CRb.

As same as the example shown in FIG. 4, the devices A and B start timing of durations of the transmission wait times after completing the communication preparations. In FIG. 5, since the acquisition data 20 or the turn data 21 are not transmitted from other device during the transmission wait time, it is judged that there is no master on the network.

When it is judged that there is no master on the network, the device A (or the device B) transmits the acquisition data 20a (or 20b) to the network 6 with the packet transmission start timing PTa (or PTb) after two seconds from the communication preparation completion timing CRa (or CRb). The acquisition data 20a (or 20b) transmitted from the device A (or the device B) is presented on the network after passing the delay time.

After transmitting the acquisition data 20a (or 20b), the device A (or the device B) starts timing of duration of the master acquisition time. After presenting the acquisition data 20a (or 20b) on the network 6, the device A (or the device B) receives it and compares its own priority PR with the received acquisition data 20b (or 20a).

Since the priority PR of the device B included in the received acquisition data 20b is lower than that of the device A, the device A continues the same comparison until the master acquisition time completion timing (master setting timing) MS from timing RC at a time of completing the comparison if the acquisition data 20 is received from the other device.

Since the priority PR of the device A included in the received acquisition data 20a is higher than that of the device B, the device B terminates the comparison of the priorities and sets its own device as a slave at a slave setting timing (the master acquisition time completion timing) SS.

As described in the above, when the plurality of devices are connected to the network 6 at the same time, each device transmits and receives the acquisition data including its priority. Then, a device with the highest priority is set to be a master by comparing the priority with those of the other devices.

Figure 6:
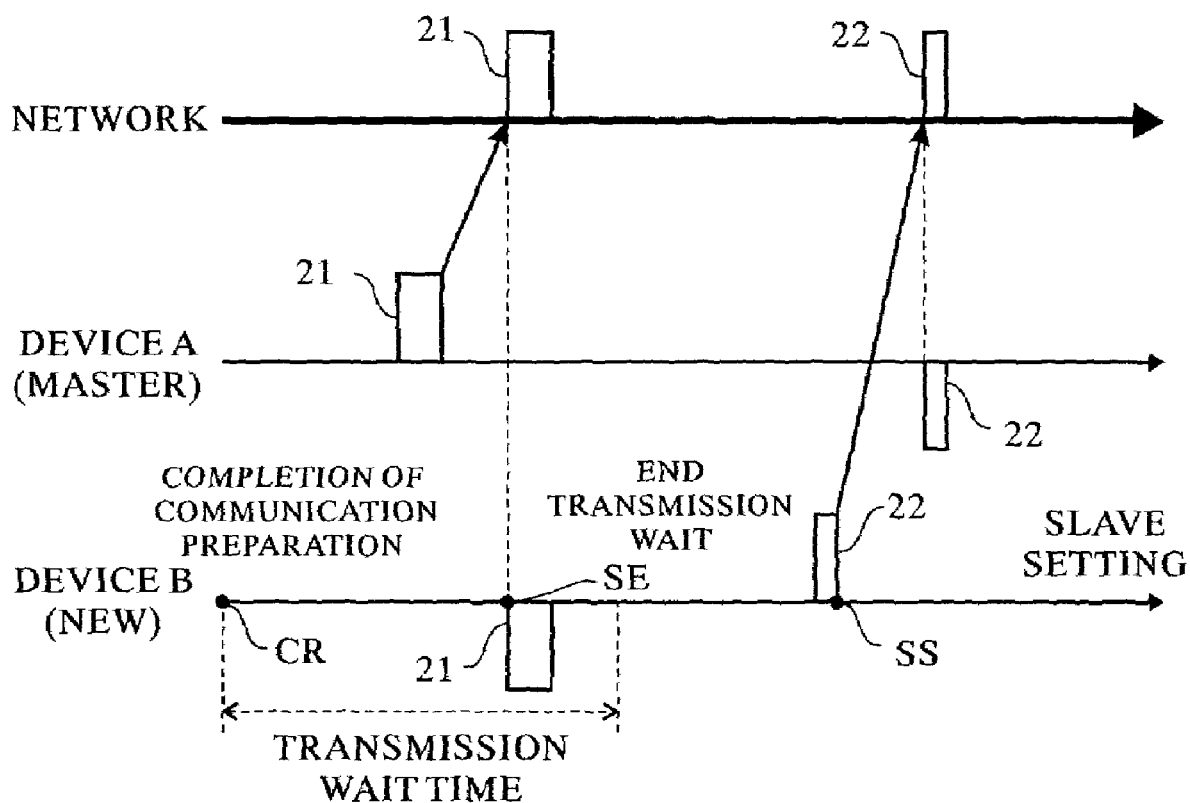
FIG. 6 is a schematic diagram showing a third example of a master device designation process according to the embodiment of the present invention.

FIG. 6 is a schematic diagram showing a third example of the master device designation process according to the embodiment of the present invention. In this example, an operation of the device B that is newly connected to the network in a case that the device A that is already a master is connected to the network is shown. Moreover, time flow represented from left to right in the figure. Also, "the network" represents a status of data flowing on the network.

When the device B (the combination of the original generating controller 2 and the amplifier controller 3) is connected to the network 6, initial setting for communication preparation is executed. In the drawing, a time when the preparation for communication of the device A is completed and transmission and reception becomes possible is indicated with a timing CR. Also, transmission data is indicated on a horizontal line of the devices A and B, and reception data is indicated below the horizontal line of the devices A and B.

When the communication preparation is completed, a device B starts timing of duration of a transmission wait time to stop a transmission process for two seconds after the communication preparation completion timing CR. In this example, since the device A has already been working as a master, the turn data 21 representing transmission turn of each device is transmitted to the network 6 at least once from the device A during this communication wait time.

When the turn data 21 transmitted from the device A is presented on the network 6, the device B receives it. Since reception of the turn data 21 indicates that there is a master device on the network 6, the communication waiting is terminated at a reception timing SE of the turn data 21.

After that, the device B transmits participation data 22 that requests for including its own device in the turn data thereafter. The device A receives the participation data from the network 6 and sets to include the device B in the turn data generated thereafter.

In the conventional apparatus, when a new device is connected to the network, for example, the priority comparison shown in FIG. 1 is executed by each time. In the third master setting example, in a case that a master has already set, the new device is always set to be a slave automatically even if the priority of the new device is higher than priority that the present master has.

By doing that, even if a new device (a combination of the original generating controller 2 and the amplifier controller 3) is connected to the network 6, the priority comparison is not necessary, and it is not necessary to stop other communication. Therefore, the new device can be connected rapidly without obstructing the other communication.

Figure 7:
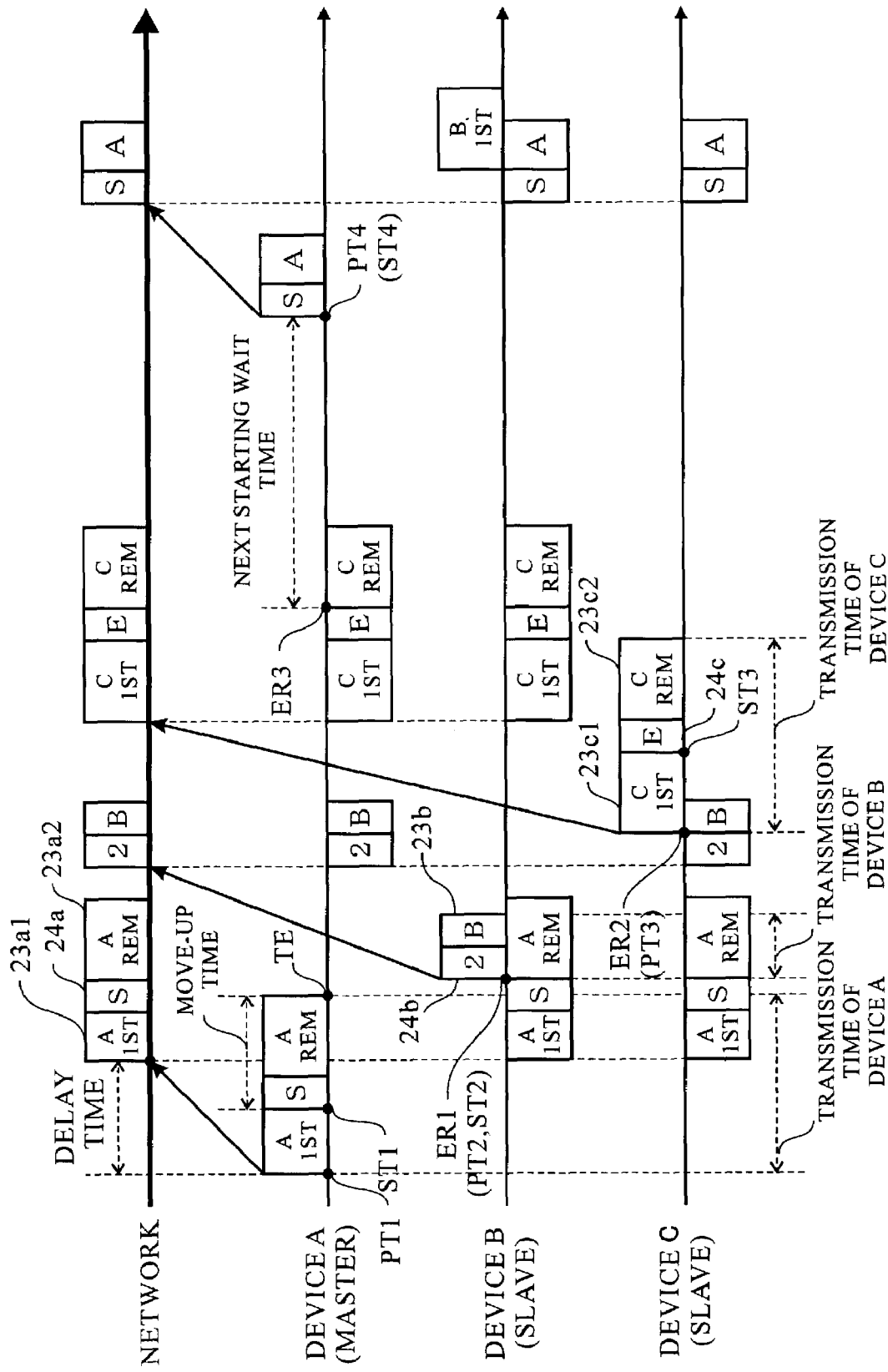
FIG. 7 is a schematic diagram showing an example of communication of setting information 23 according to the embodiment of the present invention.

FIG. 7 is a schematic diagram showing an example of communication of the setting information 23 according to the embodiment of the present invention. In this example, the device A is set to be a master, and the devices B and C are set to be slaves are connected on the network 6.

Here, the setting information 23 is low-priority data except high-priority data (transmitted at a high communication rate). For example, the status data 18, the modification data, the acquisition data 20, the turn data 21, the participation data 22 and the like are included in (are considered as) the setting information 23. Moreover, although MIDI data is not data representing a setting of the device or a setting status, it can be transmitted and received by the same process as the setting information 23 because of being transmitted with a lower priority.

The device A starts transmission of the setting information 23a (setting information 23a1 that is a first half of the information) to be transmitted at a packet transmission start timing PT1. The transmission of setting information 23a is continued until a transmission timing STa of starting data 24a, and when the transmission timing ST1 has come, transmission of the starting data 24a is executed as interrupting transmission of the setting information 23a. When the transmission of starting data 24a is completed, the transmission of setting information 23a2 that is a remaining part of the data to be transmitted by the device A is started. Since the device A is a master, the turn data 21 is included in the starting data 24a.

The transmission timing ST of the starting data 24 is determined based on a transmission time TT that is a time for transmission of data to be transmitted and the starting data 24 and a set move-up time as described later. That is, the transmission time is obtained by the following equation: the transmission time=a present time (the timing PT)+transmission time TT−the move-up time (20 ms).

Here, the move-up time is a time for moving up the transmission time of starting data 24 taking delay time on the network into consideration, and it is set to be 20 ms as same as the delay time in the embodiment of the present invention. By transmitting starting data 24 earlier than a packet transmission completing schedule time for the move-up time that is the same as the delay time, a device that starts transmission next can start packet transmission immediately after the completion of the packet transmission of the device before. By doing this, a situation wherein no data is on the network can be decreased as much as possible by taking delay time into consideration on the network in advance.

When the device B receives the starting data 24a transmitted from the device B, it starts transmission of the starting data 24b from a timing ER1 that is the reception completion time. It is because an amount of data of the setting information to be transmitted by the device B, and the move-up time is longer than the transmission time TT. In this case, as shown in the drawing, the starting data 24b is transmitted prior to the setting information 23b. When the transmission of the starting data 24b is completed, the transmission of the setting information 23b is started.

When the device C receives the starting data 24b transmitted from the device B, it starts transmission of the setting information 23c (setting information 23c1 that is a first half of the information) to be transmitted from the timing ER2 that is the reception completion timing. The transmission of the setting information 23c is continued until a transmission timing ST3 of the starting data 24c. When the transmission timing ST3 has come, the transmission of the starting data 24c is executed as interrupting transmission of the setting information 23c. When the transmission of the starting data 24c is completed, the transmission of the setting information 23c2 that is a remaining part of the data to be transmitted by the device C is started.

The device A receives the starting data 24c transmitted from the device C, timing of next starting wait time from a timing ER3 that is the terminating timing is started. Transmissions and receptions of the slave devices already connected to the network is paused during the next starting wait time.

The starting wait time is a fixed time from timing ER3 when a transmission for one cycle is completed (a time of receiving the starting data 24c) to a timing PT4 when a next cycle starts, and a device newly connected to the network 6 transmits the participation data 22 in the next starting wait time.

After elapsing the next starting wait time, the device that is the master resumes the transmission of the starting data 24a including the new turn data 21 and the packet.

As described in the above, a device that transmits next can start transmission of setting information 23n to be transmitted by its own device before completing reception of setting information 23n-1 transmitted from a device that transmits before.

In the embodiment of the present invention, with a consideration of the delay time on a network, the transmission timing ST of the starting data that instructs the start of transmission to the following apparatus is brought forward. Therefore, even if transmission is started before completing reception, it is avoided that setting information 23 transmitted from two or more devices exist at the same time on the network, and a situation wherein no data is on the network can be less.

Figure 8:
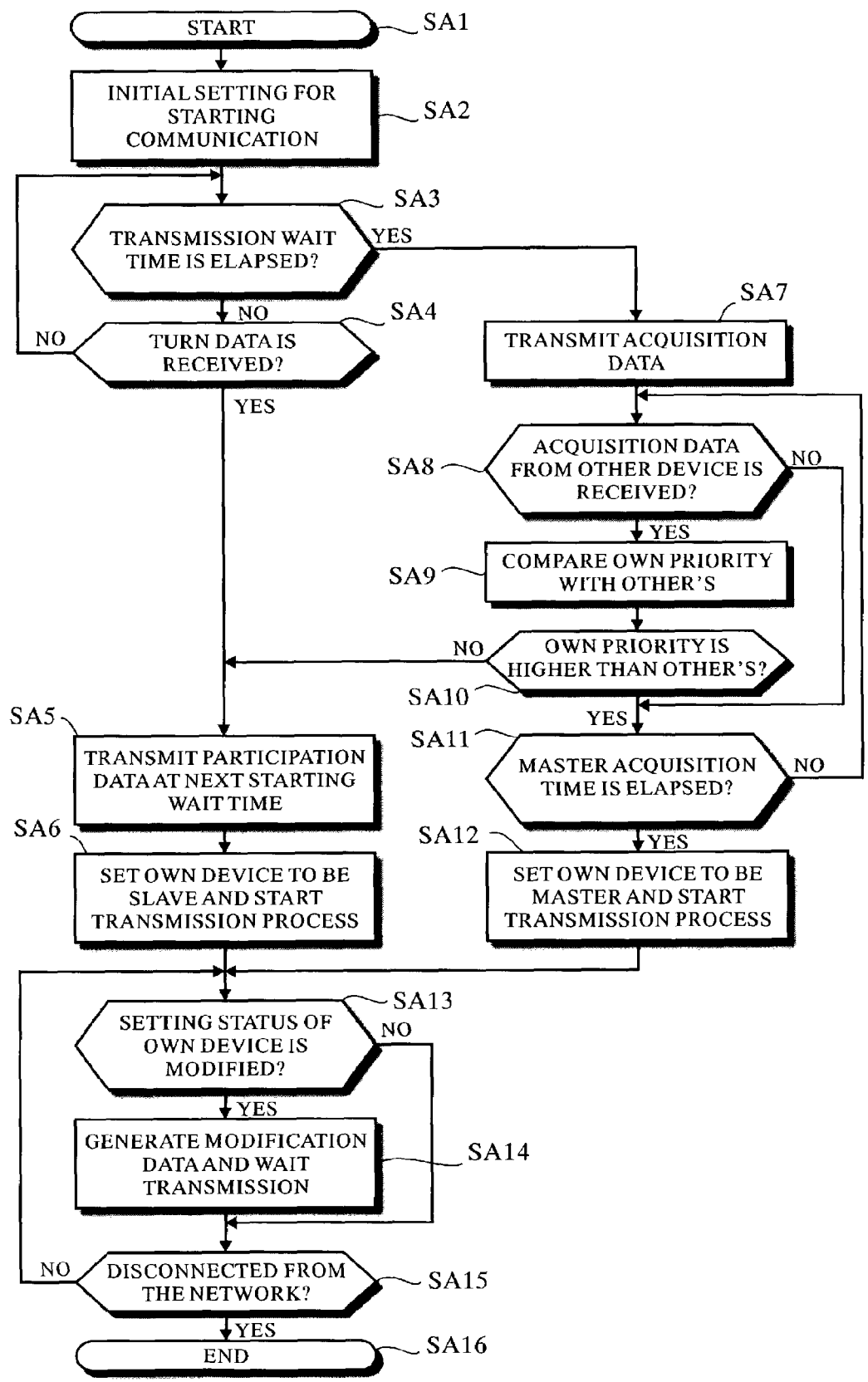
FIG. 8 is a flow chart showing a main process according to the embodiment of the present invention.

FIG. 8 is a flow chart showing a main process according to the embodiment of the present invention. This main process is started when the communication management apparatus (a combination of the original generating controller 2 and the amplifier controller 3) is connected to the network 6 and terminated when the apparatus is disconnected from the network 6. The main process is a process for executing master setting at the devices A and B shown in the above-described FIGS. 4 to 6.

Figure 9:
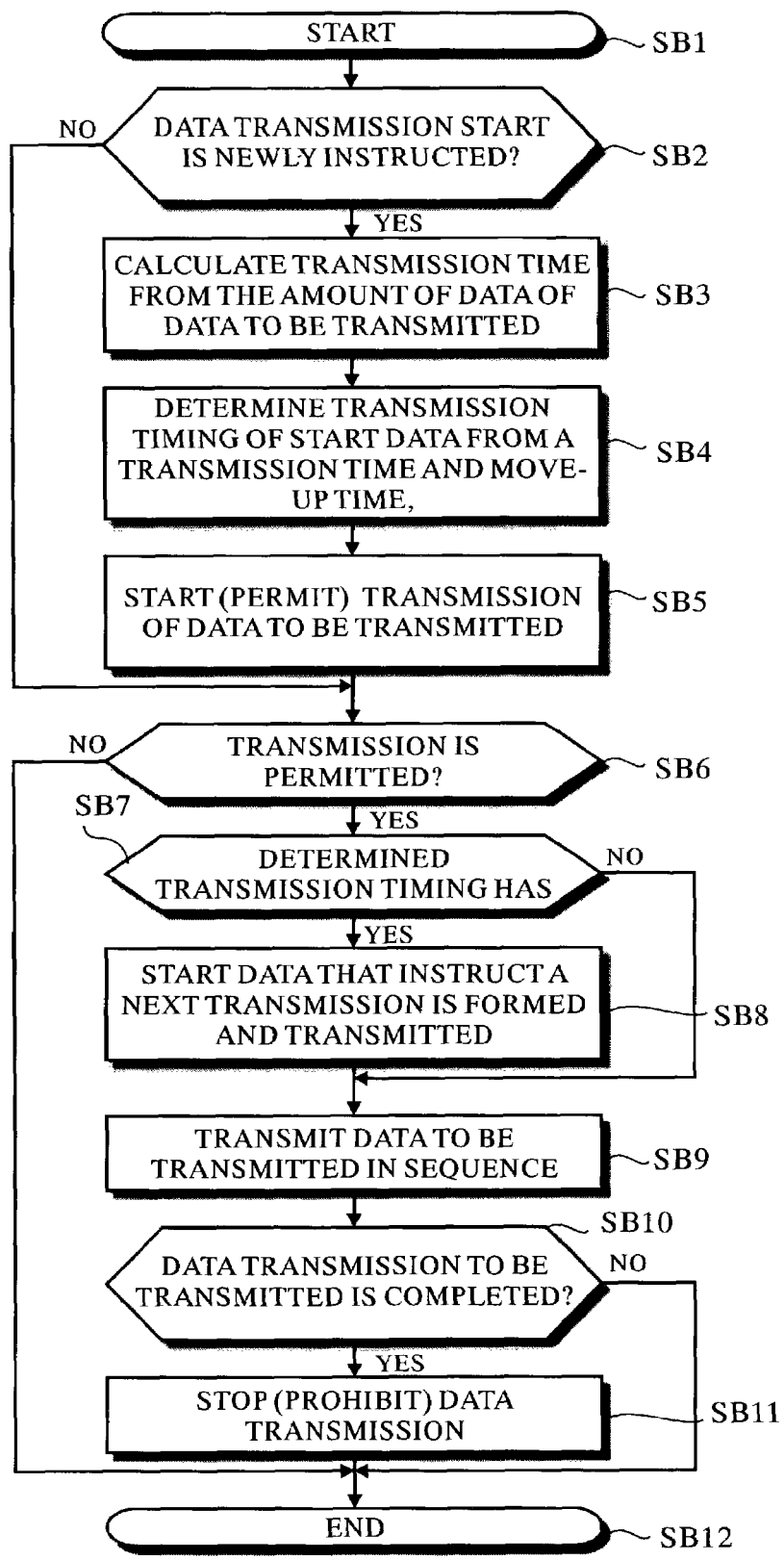
FIG. 9 is a flow chart showing a transmission process of setting information 23 and MIDI data according to the embodiment of the present invention.
Figure 10:
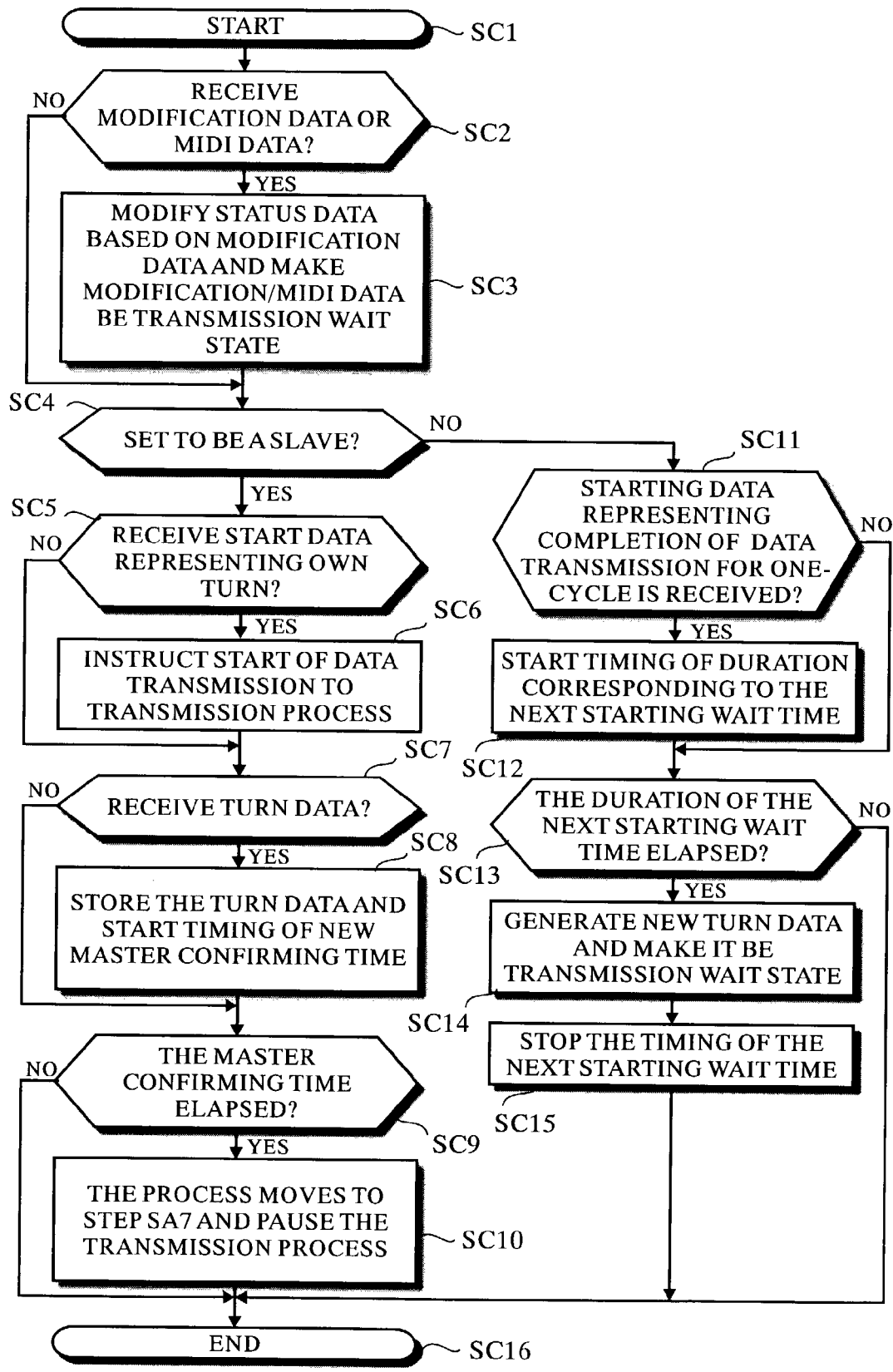
FIG. 10 is a flow chart showing a reception process of setting information 23 and MIDI data according to the embodiment of the present invention.

At Step SA1, a main process is started. At Step SA2, an initial setting is executed to be able to start communication. That is, the initial setting is executed to be able to start process relating to communication such as storing data to be transmitted, packetization of the transmitting data, transmitting the packetized data, releasing (depacketizing) of the received packet and the like. At this time, the reception process shown in FIG. 10 is started. Transmission process shown in FIG. 9 starts timing of the transmission wait time shown in FIGS. 4 to 6, and the apparatus is set to be in a state of pausing (waiting) transmission.

At Step SA3, it is judged whether duration of the transmission wait time has elapsed or not. In a case that the duration of the transmission wait time has elapsed, the process advances to Step SA7 as indicated by an "YES" arrow. In a case that duration of the transmission wait time has not elapsed yet, the process advances to Step SA4 as indicated by a "NO" arrow.

At Step SA4, it is judged whether the turn data 21 (FIG. 6) is received from the network 6 or not. When the turn data 21 is not received, the process returns to Step SA3 as indicated by a "NO" arrow. When the turn data 21 is received, it is judged that there is a master already on the network 6, and the process advances to Step SA5 as indicated by an "YES" arrow.

At Step SA5, the process is waited until the next starting wait time shown in FIG. 7 comes, and when the next starting wait time has come, the participation data 22 shown in FIG. 6 is transmitted. At Step SA6, own device (the apparatus executing this process) is set to be a slave. Then, the transmission process shown in FIG. 9 is booted (started), and the process advances to Step SA13.

The above-described Step SA5 and Step SA6 are for the process in a case of operating as a slave. The below-described Step SA7 to Step SA12 are for the process in a case of operating as a master.

At Step SA7, the acquisition data 20 shown in FIGS. 4 and 5 is transmitted, and timing of the acquisition time is started. At Step SA8, it is judged whether the acquisition data 20 of other device connected to the network 6 is received or not. In a case that the acquisition data 20 is received, the process advances to Step SA9 as indicated by an "YES" arrow. In a case that the acquisition data 20 is not received, the process advances to Step SA11 as indicated by a "NO" arrow.

At Step SA9, the priority PR of own device (the apparatus executing this process) is compared to the priority of other device included in the acquisition data 20. At Step SA10, it is judged whether the priority of the own device is higher than the priority of other device or not by referring the comparison result at Step SA9. In a case that the priority of the own device is higher than that of the other device, the process advances to Step SA11 as indicated by an "YES" arrow. In a case that the priority of the own device is lower than that of the other device, the process advances to Step SA5 as indicated by a "NO" arrow.

At Step SA11, it is judged whether duration of the master acquisition time has elapsed or not. In a case that the duration of the master acquisition time has not elapsed yet, the process returns to Step SA8 as indicated by a "NO" arrow, and the reception of the acquisition data 20 of the other device is prepared. In a case that the duration of the master acquisition time has already elapsed, the process advances to Step SA12 as indicated by an "YES" arrow, and set the own device to be a master. Then, the transmission process shown in FIG. 9 is booted (started), and thereafter the process advances to Step SA13.

Step SA13 to Step SA15 are for a common process executed in both processes for setting a master and a slave.

At Step SA13, it is judged whether setting status (the status data 18) of the own device is modified or not. In the setting status of the own device, naturally, setting such as connected amplifier and the like is included. In a case that the setting status is modified, the process advances to Step SA14 as indicated by an "YES" arrow. In a case that the setting status is not modified, the process advances to Step SA15 as indicated by a "NO" arrow.

At Step SA14, the modification data that represents contents of the modification to the setting data is formed to be a state of transmission wait. The modification data in a transmission wait state is transmitted to the network by the below-described transmission process shown in FIG. 9.

At Step SA15, it is judged whether the communication is disconnected from the network 6 or not. In a case that the communication is disconnected from the network 6, the process advances to Step SA16 as indicated by an "YES" arrow, and all processes relating to the network communication are paused, and thereafter the main process is terminated. In a case that the communication is not disconnected from the network 6, the process returns to Step SA13 as indicated by a "NO" arrow, and thereafter the process after that is repeated.

FIG. 9 is a flow chart showing a transmission process of the setting information 23 and MIDI data according to the embodiment of the present invention. This process is a timer interruption process booted in accordance with a transmission rate of the setting information 23 and MIDI data. This transmission process is executed, for example, at the time of transmitting the setting information 23 (and the starting data 24) shown in FIG. 7 by the devices A to C (each of which is a combination of the original generating controller 2 and the amplifier controller 3).

At Step SB1, the transmission process is started. At Step SB2, whether starting of data transmission is newly instructed or not is judged. When the apparatus executing this process is set to be a slave, reception of the starting data 24 for a transmission turn of the apparatus executing this process means that the starting of data transmission is newly instructed. When the apparatus executing this process is set to be a master, the starting of data transmission is considered to be instructed at a time when the next starting wait time shown in FIG. 7 is elapsed from the reception of the starting data 24c (FIG. 7) representing completion of transmissions for one cycle. When the starting of data transmission is instructed, the process advances to Step SB3 as indicated by an "YES" arrow. When the starting of data transmission is not instructed, the process advances to Step SB6 as indicated by a "NO" arrow.

At Step SB3, the transmission time TT (FIG. 7) is calculated from an amount of data to be transmitted. The data to be transmitted are all the data waiting for being transmitted, for example, are the setting information 23 such as the status data 18, the modification data, the acquisition data 20, the turn data 21, the participation data 22, etc. and MIDI data, etc. Further, at a time of the first transmission after the connection to the network, the status data 18 representing all the statuses of own device (all the statuses of the device executing this transmission process) is transmitted, and the modification data representing only a modified portion of the status is transmitted thereafter. Furthermore, The transmission time TT includes a time for transmitting the starting data 24.

At Step SB4, the transmission timing ST of the starting data 24 is determined in accordance with the transmission time TT calculated at Step SB3 and the move-up time (FIG. 7). The transmission timing ST is calculated from the following equation: the transmission timing ST=the present time (the timing PT in FIG. 7)+the transmission time TT−the move-up time (20 ms). At Step SB5, the transmission of the data to be transmitted is started (permitted).

At Step SB6, whether the transmission is permitted or not, that is, the transmission of the data to be transmitted was permitted at Step SB5 is judged. When the process has been advanced from Step SB2 to this Step SB6, the transmission is not permitted; therefore, the process advances to Step SB12 as indicated by a "NO" arrow, and the transmission process at this timer interruption timing is terminated. When the process has been advanced from Step SB5 to this Step SB6, the transmission is permitted; therefore, the process advances to Step SB7 as indicated by an "YES" arrow.

At Step SB7, whether the present time reaches the transmission timing ST determined at Step SB4 or not is judged. When the present time reaches the transmission timing ST, the process advances to Step SB8 as indicated by an "YES" arrow. As in the example of the data transmission of the device B in FIG. 7, when the determined transmission timing PT is older than the packet transmission starting timing PT, the starting data 24 (or the turn data 21) is transmitted before the data to be transmitted. When the present time has not reached the transmission timing ST yet, the process advances to Step SB9 as indicated by a "NO" arrow.

At Step SB8, the transmission of the data (the setting information 23) to be transmitted by own device (the apparatus executing this process) is temporarily paused, and the starting data 24 (or the turn data 21) for instructing transmission of data to the next device to transmit the data is generated and transmitted. When the apparatus executing this process is set to be a slave and is not the last device to transmit the data, the starting of the transmission is instructed to the device of the next turn. When the apparatus executing this process is set to be a slave and is the last device to transmit the data, the starting data 24c representing the completion of one cycle is generated and transmitted. When the apparatus executing this process is set to be a master, the turn data 21 representing a transmission order of all the devices connected to the network at the time and the starting data 24a including the instruction for the first device to transmit data.

At Step SB9, the setting information 23 as the data to be transmitted is sequentially transmitted to the network. At Step SB10, whether the transmission of the data to be transmitted is completed or not is judged. When the transmission is completed, the process advances to Step SB11 as indicated by an "YES" arrow, and then, the transmission will be stopped (prohibited). When the transmission is not completed, the process advances to Step SB12 as indicated by a "NO" arrow, and the transmission process at this timer interruption timing is terminated. Thereafter, until the transmission of all the data to be transmitted is completed, a portion of the setting information 23 is transmitted at the time when this transmission process shown in FIG. 9 is executed.

FIG. 10 is a flow chart showing a reception process of the setting information 23 and MIDI data according to the embodiment of the present invention. This process is a timer interruption process booted in accordance with a transmission rate of the setting information 23 and MIDI data. This reception process is executed, for example, at the time of receiving the setting information 23 (or the starting data 24) shown in FIG. 7 by the devices A to C (each of which is a combination of the original generating controller 2 and the amplifier controller 3).

At Step SC1, the reception process is started, and at Step SC2, whether the modification data or MIDI data is received or not is judged. When the reception of the modification data or MIDI data is detected, the process advances to Step SC3 as indicated by an "YES" arrow. When the reception of the modification data or MIDI data is not detected, the process advances to Step SC4 as indicated by a "NO" arrow.

At Step SC3, when the reception of the modification data is detected at Step SC2, a portion of the stored status data 18 corresponding to the received modification data is modified in accordance with the received modification data. When the received modification data is received from the original generator 4, the amplifier 5 or the computer PC connected to own device (the apparatus executing this process), the modification data will be in a state of waiting transmission. When the received modification data is received from the network, the received modification data is retransmitted to the corresponding original generator 4, the amplifier 5 or the computer PC (to a device which the modification data should be applied). When the reception of the MIDI data is detected at Step SC2, the MIDI data will be in a state of waiting transmission.

At Step SC4, whether the communication management apparatus executing this process (the original generating controller 2 or the amplifier controller 3) is set to be a slave at the above-described Step SA6 or not is judged. When the apparatus is set to be a slave, the process advances to Step SC5 as indicated by an "YES" arrow. When the apparatus is not set to be a slave, that is, the apparatus is set to be a master at the above-described Step SA12, the process advances to Step SC11 as indicated by a "NO" arrow.

The below-described Step SC5 to Step SC10 represent the process as a slave device, and the below-described Step SC11 to Step SC15 represent the process as a master device.

At Step SC5, whether the starting data 24 (FIG. 7) representing a transmitting turn of own device (the apparatus executing this process) is received or not is judged. When the starting data 24 is received, the process advances to Step SC6 as indicated by an "YES" arrow. When the starting data 24 is not received, the process advances to Step SC7 as indicated by a "NO" arrow.

At Step SC6, starting of data transmission is instructed to Step SB2 of the above-described transmission process shown in FIG. 9. At Step SC7, whether the turn data 21 (FIG. 6) is received or not is judged. When the turn data 21 is received, the process advances to Step SC8 as indicated by an "YES" arrow. When the turn data 21 is not received, the process advances to Step SC9 as indicated by a "NO" arrow.

At Step SC8, the turn data 21 received at Step SC7 is stored in the temporal storage area and restart timing of the master confirming time. At Step SC9, whether the duration of the master confirming time is elapsed or not is judged. When the duration is elapsed, the process advances to Step SC10 as indicated by an "YES" arrow. When the duration is not elapsed, the process advances to Step SC16 as indicated by a "NO" arrow, and the reception process at this timer interruption timing is terminated.

At Step SC10, it is considered that a master is now out of the network because the turn data 21 is not received by the elapsing of the master confirming time; therefore, the master obtaining process will be executed by moving the process to Step SA7 of the main process. Also, the booting up of the transmission process shown in FIG. 9 will be paused. At the mean time, all the slaves on the network execute the operation for obtaining a master (a request for being a master). Thereafter, the process advances to Step SC16, and the reception process at this timer interruption timing is terminated.

At Step SC11, whether the starting data (for example, the starting data 24c shown in FIG. 7) representing a completion of transmission for one cycle is received or not is judged. When the starting data is received, the process advances to Step SC12 as indicated by an "YES" arrow, and timing of a time corresponding to the next starting wait time (FIG. 7) is started. When the starting data is not received, the process advances to Step SC13 as indicated by a "NO" arrow.

At Step SC13, when the duration of the next starting wait time is timed, whether the duration of the next starting wait time is elapsed or not is judged. When the duration of the next starting wait time is elapsed, the process advances to Step SC14 as indicated by an "YES" arrow. When the duration of the next starting wait time is not elapsed, the process advances to Step SC16 as indicated by a "NO" arrow, and the reception process at this timer interruption timing is terminated.

At Step SC14, the turn data 21 (FIG. 6) is newly generated, and the generated new turn data 21 is in a state of waiting transmission. Further, when the participation data 22 (FIG. 6) is received from the newly connected device during the next starting wait time, the turn data 21 including the device newly connected to the network is generated.

At Step SC15, the timing of the next starting wait time is terminated, and at Step SC16, the reception process at this timer interruption timing is terminated.

FIG. 11 is a flow chart showing a transmission process of main data (audio digital data) according to the embodiment of the present invention. This process is a timer interruption process booted in accordance with a transmission rate of the main data (audio digital data). That is, for executing the transmission of audio data with extremely higher priority over the transmission of the other data, a cycle of the timer interruption timing for this process is set to be extremely shorter than those of the transmission process shown in FIG. 9 and the reception process shown in FIG. 10.

Figure 11A:
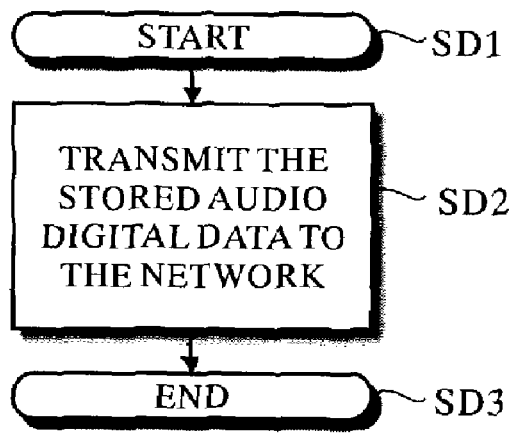
FIG. 11 is a flow chart showing a transmission process of main data (audio digital data) according to the embodiment of the present invention.

FIG. 11A is a flow chart showing the transmission process of main data (audio digital data) executed in the original generating controller 2.

At Step SD1, the transmission process is started, and at Step SD2, the digital audio data stored at the below-described Step SF2 is transmitted to the network. Thereafter, the process advances to Step SD3, and the transmission process at this timer interruption timing is terminated.

Figure 11B:
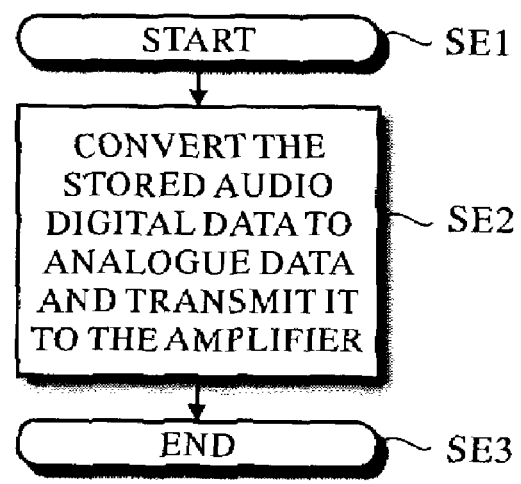

FIG. 11B is a flow chart showing the transmission process of main data (audio digital data) executed in the amplifier controller 3.

At Step SE1, the transmission process is started, and at Step SE2, the digital audio data stored at the below-described Step SG2 is converted to audio analogue data (analogue audio signal) and output to the amplifier 5. Thereafter, the process advances to Step SE3, and the transmission process at this timer interruption timing is terminated.

FIG. 12 is a flow chart showing a reception process of main data (audio digital data) according to the embodiment of the present invention. This process is a timer interruption process booted in accordance with a transmission rate of the main data (audio digital data). That is, for executing the transmission of audio data with extremely higher priority over the transmission of the other data, a cycle of the timer interruption timing for this process is set to be extremely shorter than those of the transmission process shown in FIG. 9 and the reception process shown in FIG. 10.

Figure 12A:
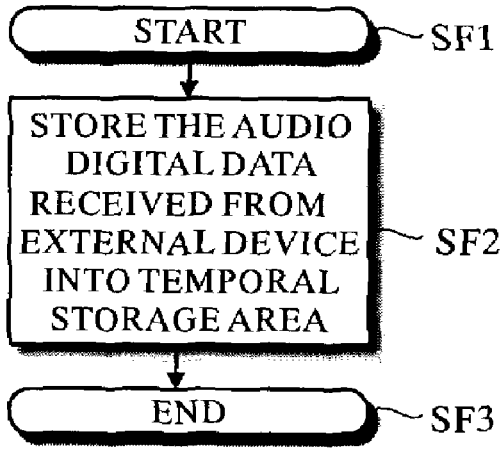
FIG. 12 is a flow chart showing a reception process of main data (audio digital data) according to the embodiment of the present invention.

FIG. 12A is a flow chart showing the reception process of main data (audio digital data) executed in the original generating controller 2.

At Step SF1, the reception process is started, and at Step SF2, digital audio data received (input) from the external device (the music data output apparatus 4) is stored in the temporal storage area in the RAM 9, etc. Thereafter, the process advances to Step SF3, and the reception process at this timer interruption timing is terminated.

Figure 12B:
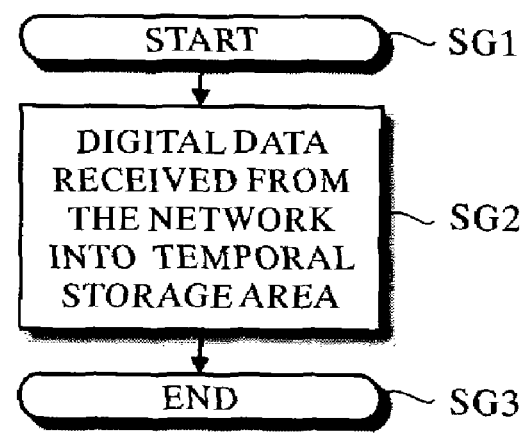

FIG. 12B is a flow chart showing the reception process of main data (audio digital data) executed in the amplifier controller 3.

At Step SG1, the reception process is started, and at Step SG2, the digital audio data transmitted at the above-described Step SD2 is received from the network 6 and is stored in the temporal storage area in the RAM 9, etc. Thereafter, the process advances to Step SG3, and the reception process at this timer interruption timing is terminated.

As described in the above, according to this embodiment, each of the devices connected to the network stores the setting status of every device; therefore, desired data relating to each one of the devices can be confirmed rapidly. Also, form any one of the devices, the setting statuses of all the devices can be confirmed rapidly.

Also, according to this embodiment, when setting is modified, the modification data representing only the modified portion of the setting is transmitted/received via the network 6 to renew the setting information stored in each of the devices. Therefore, in a case that the setting status of any one of the devices connected to the network is modified, the setting status can be modified rapidly without increasing traffic of the network at the lower communication rate.

Further, according to this embodiment, when a master device managing transmission order of each device exists on the network, the devices do not execute the operation of requesting to be a master device; therefore, frequent change of a master device can be prevented.

Therefore, transmission of a request for being a master device will be unnecessary, and interference of the communication of the other information during the transmission of the request can be prevented.

Moreover, according to this embodiment, a delay time of network communication can be preset as the move-up time, and the starting data instructing starting of the transmission of the next device can be transmitted before a completion of the transmission for the move-up time.

Therefore, time when no data is flowing on the network can be extremely shortened, and data transmission can be executed efficiently on the network with a lower communication rate.

Although, in this embodiment, the original generating controller 2 and the amplifier controller 3 are different in a part of their functions, one controller (communication management apparatus) can have all the functions of both the original generating controller 2 and the amplifier controller 3.

Moreover, the transmission wait time and the master obtaining time are duration of time including a plurality of one-cycle transmissions, they are not limited to a predetermined value (for example, two seconds). The transmission wait time and the master obtaining time can be set on the computer PC, the amplifier 5 or various controllers (the original generating controller 3 and the amplifier controllers3). Also, the transmission wait time and the master obtaining time can be flexibly changed in accordance with the communication status (traffic) by making a master device observe the communication status. For example, when the communication status is bad, that is, the traffic of the communication is heavy, the duration of the transmission wait time and the master obtaining time may be set to be longer than the predetermined value.

Furthermore, in the embodiment, when the plurality of the obtaining data exist on the network, the obtaining data having the highest priority will be in effect. However, any one of the devices on the network can be a master device regardless of the priorities. In that case, for example, a device connected to a good communication line (light traffic) may be a master device. Also, a master device can be selected manually by a user using the computer PC, the amplifier 5 or various controllers (the original generating controller 3 and the amplifier controllers3).

Although the move-up time is determined to be the same as the transmission delay time in the embodiment, the move-up time may be determined to be approximately the same as the transmission delay time. For example, the move-up time can be changed in accordance with the flexibly changing delay time based on the communication status (traffic). Also, the move-up time can be set or changed manually by a user using the computer PC, the amplifier 5 or various controllers (the original generating controller 3 and the amplifier controllers3).

Moreover, although only the main data (audio data, etc.) is transmitted/received at a communication rate higher than the other data (setting information 23 and MIDI data), all kinds of data relating music can be transmitted/received at the higher communication rate. For example, a data packet including MIDI data may be transmitted/received at the higher communication rate as same as the main data.

Further, the communication interface may be connected to a communication network such as a LAN, the Internet, a public telephone line, etc., and is connected to a server computer via the communication network. When the control program and various data are not stored in an external storage device, the communication interface can be used for downloading the program and data.

The present invention has been described in connection with the preferred embodiments. The invention is not limited only to the above embodiments. It is apparent that various modifications, improvements, combinations, and the like can be made by those skilled in the art.

What are claimed are:

1. A communication management apparatus, in an audio data communication management system having a plurality of other communication management apparatuses, wherein said communication management apparatus and other communication management apparatuses are connected to a network, said communication management apparatus comprising:

a memory that stores a priority data representing a priority level of the communication management apparatus in relation to the other communication management apparatuses;

a master confirming device that confirms an existence of a master apparatus managing communication of the network on the network during a first predetermined time, which occurs after the communication management apparatus is connected to the network and is ready for communication;

a master acquisition requesting device that transmits, to the network, a first acquisition data for requesting the communication management apparatus to be the master apparatus if the master confirming device cannot confirm the existence of the master apparatus on the network, wherein the first acquisition data includes the priority data for the communication management apparatus;

a master setting device that sets the communication management apparatus to be the master apparatus after the first acquisition data is transmitted and after a second predetermined time is elapsed;

a comparing device that compares, when the communication management apparatus receives from one of the other communication management apparatuses during the second predetermined time a second acquisition data for requesting the one of the other communication management apparatuses to be the master apparatus, the priority data of the communication management apparatus and the priority data representing the priority level of said one of the other communication management apparatuses included in the received second acquisition data;

a first slave setting device that sets the communication management apparatus to be a slave apparatus if the comparing device determines the priority level of the communication management apparatus to be lower than the priority level of said other communication management apparatuses; and a second slave setting device that sets, if the master confirming device confirms the existence of the master apparatus on the network, the communication management apparatus to be the slave apparatus without comparing the priority level of the communication management apparatus and the priority level of the master apparatus;

a first transmitter device that transmits an audio data at a first transmission rate to the network;

a first memory that stores a first status data representing setting status of the communication management apparatus;

a second transmitter that transmits the first status data at a second transmission rate lower than the first transmission rate to the network;

a first receiver that receives an order data generated by the master apparatus via the network, wherein the order data represents an order of transmission of the respective ones of the plurality of the communication apparatuses included in the audio data communication management system;

a third transmitter that transmits a first modification data indicating modification of the first status data at an order specified by the received order data;

a second receiver that receives a second status data representing setting status of at least one of the other communication management apparatuses at the second communication rate from said one of the other communication management apparatuses via the network;

a second memory that stores the received second status data;

a third receiver that receives a second modification data indicating modification of the second status data from said at least one of the other communication management apparatuses; and a modifying device that modifies the second status data stored in the second memory in accordance with the received second modification data.

2. The communication management apparatus according to claim 1, wherein a third predetermined time is timed after the communication management apparatus is set as the slave apparatus, and further comprising:

a judging device that periodically judges whether the third predetermined time should be reset;

a resetting device that resets the third predetermined time when the judging device judges that the third predetermined time should be reset; and a reconfirming device that makes the master confirming device reconfirm the existence of a master apparatus on the network when the resetting device does not reset the third predetermined time until the third predetermined time is elapsed.

3. The communication management apparatus according to claim 1, wherein the comparing device continues to compare the priority level of the communication management apparatus with the priority level of the other communication management apparatuses until the second predetermined time is elapsed after the comparing device judges the priority of the communication management apparatus is higher than the priority of The other communication management apparatuses.

4. The communication management apparatus according to claim 1, wherein the first predetermined time is a duration of time longer than a time for all the communication management apparatuses on the network to transmit data once, sequentially, to the network.

5. The communication management apparatus according to claim 1, wherein the master confirming device confirms the existence of the master apparatus on the network by determining whether the communication management apparatus receives the order data.

6. A communication management apparatus, in an audio data communication management system having a plurality of other communication management apparatuses, wherein said communication management apparatus and other communication management apparatuses are connected to a network, said communication management apparatus comprising:

a first transmitter that transmits an audio data at a first transmission rate to the network;

a first memory that stores a first status data representing setting status of said communication management apparatus;

a first receiver that receives an order data generated by one of the other communication management apparatuses set as a master apparatus via the network, wherein the order data represents an order of transmission of respective ones of said plurality of the communication apparatuses included in said audio data communication management system;

a second receiver that receives a first start data;

a determining device that determines, in accordance with a transmission time for transmission of the first status data to be transmitted and a move-up time determined based on a delay time of the transmission of the data to the network, a timing at which the communication management apparatus transmits a second start data to one of the other communication management apparatuses indicating to transmit data subsequently to the communication management apparatus according to the order data, upon reception of the first start data;

a second transmitter that starts transmission of the first status data to the network at a second transmission rate lower than the first transmission rate after the timing is determined by the determining device;

a third transmitter that suspends the transmission of the first status data and starts transmission of the second start data to the one of the other communication management apparatuses upon the determined timing;

a fourth transmitter that restarts the transmission of the first status data after the transmission of the second start data is completed;

a second memory that stores a second status data representing setting status of the other communication management apparatuses;

a third receiver that receives a modification data instructing modification of the second status data from said at least one of the other communication management apparatuses; and a modifying device that modifies the second status data in accordance with the received modification data.

7. The communication management apparatus according to claim 6, wherein the first start data is data transmitted from another one of the other communication management apparatuses that transmits data before the communication management apparatus transmits data according to the order data.

8. The communication management apparatus according to claim 6, wherein the third transmitter transmits the second start data at the second transmission rate.

9. The communication management apparatus according to claim 6, further comprising:
fifth transmitter that transmits the second start data before starting the transmission of the first status data after the timing has come, if the transmission time is shorter than the move-up time; and
sixth transmitter that starts the transmission of the first status data after the transmission of the second start data is completed if the transmission time is shorter than the move-up time.

10. The communication management apparatus according to claim 6, further comprising a connector that connects with an external audio data source.

11. The communication management apparatus according to claim 10, wherein said first status data includes an input assignment data input from said external audio data source and an output assignment of data output to said external audio data source.

12. The communication management apparatus according to claim 6, wherein said second status data includes an input assignment of data input from an external audio data source and an output assignment of data output to said external audio data source.

13. The communication management apparatus according to claim 6, further comprising a connector that connects with one or more external amplifiers.

14. The communication management apparatus according to claim 13, wherein said first status data includes a parameter for setting the one or more external amplifiers.

15. The communication management apparatus according to claim 14, wherein said parameter represents a loudspeaker output, a mute setting and a volume control.

16. The communication management apparatus according to claim 6, wherein said second status data includes a parameter for setting one or more external amplifiers.

17. The communication management apparatus according to claim 16, wherein said parameter represents a loudspeaker output, a mute setting and a volume control.

18. A method for controlling a communication management apparatus, said communication management apparatus being connectable to an audio data communication management system, wherein a plurality of other communication management apparatuses are included, and wherein said communication management apparatus and other communication management apparatuses are connected to a network, said method comprising the steps of:
storing a priority data representing a priority level of the communication management apparatus in relation to the other communication management apparatuses;
confirming an existence of a master apparatus managing communication of the network on the network during a first predetermined time, which occurs after the communication management apparatus is connected to the network and is ready for communication;
transmitting, to the network, a first acquisition data for requesting the communication management apparatus to be the master apparatus if the existence of the master apparatus on the network cannot be confirmed, wherein the first acquisition data includes the priority data for the communication management apparatus;
setting the communication management apparatus to be the master apparatus after the first acquisition data is transmitted and after a second predetermined time is elapsed;
comparing, when the communication management apparatus receives from one of the other communication management apparatuses during the second predetermined time a second acquisition data for requesting the one of the other communication management apparatuses to be the master apparatus, the priority data of the communication management apparatus and the priority data representing the priority level of said one of the other communication management apparatus included in the received second acquisition data;
setting the communication management apparatus to be a slave apparatus if the priority level of the communication management apparatus is determined to be lower than the priority level of said other communication management apparatuses;
setting, if the existence of the master apparatus on the network is confirmed, the communication management apparatus to be the slave apparatus without comparing the priority level of the communication management apparatus and the priority level of the master apparatus;
transmitting an audio data at a first transmission rate to the network;
storing a first status data resenting setting status of the communication management apparatus;
transmitting the first status data at a second transmission rate lower than the first transmission rate, to the network;
receiving an order data generated by the master apparatus via the network, wherein the order data represents an order of transmission of the respective ones of the plurality of the communication apparatuses included in the audio data communication management system;
transmitting a first modification data indicating modification of the first status data at an order specified by the received order data;
receiving a second status data representing selling status of at least one of the other communication management apparatuses at the second communication rate from said one of the other communication management apparatuses via the network;
storing the received second status data;
receiving a second modification data indicating modification of the second status data from said at least one of the other communication management apparatuses; and
modifying the second stabs data stored in the second memory in accordance with the received second modification data.

19. A method for controlling a communication management apparatus, said communication management apparatus being connectable to an audio data communication management system, wherein a plurality of other communication management apparatuses are included, and wherein said communication management apparatus and other communication management apparatuses are connected to a network, said method comprising the steps of:
transmitting an audio data at a first transmission rate to the network;
storing a first status data representing setting status of said communication management apparatus;
receiving an order data generated by one of the other communication management apparatuses set as a master apparatus via the network, wherein the order data represents an order of transmission of respective ones of said plurality of the communication apparatuses included in said audio data communication management system;

receiving a first start data;

determining, in accordance with a transmission time for transmission of the first status data to be transmitted and a move-up time determined based on a delay time of the transmission of the data to the network, a timing at which the communication management apparatus transmits a second start data to one of the other communication management apparatuses indicating to transmit data subsequently to the communication management apparatus according to the order data, upon reception of the first start data;

starting transmission of the first status data to the network at a second transmission rate lower than the first transmission rate after the timing is determined;

suspending the transmission of the first status data and starting transmission of the second start data to the one of the other communication management apparatuses upon the determined timing;

restarting the transmission of the first status data after the transmission of the second start data is completed;

storing a second status data representing setting status of the other communication management apparatuses;

receiving a modification data instructing modification of the second status data from said at least one of the other communication management apparatuses; and modifying the stored second status data in accordance with the received modification data.

* * * * *